United States Patent Office 3,801,514
Patented Apr. 2, 1974

3,801,514
PROCESS FOR REGENERATING SPENT ACTIVE CARBON IN A SUSPENSION-DISPERSION-TRANSPORT SYSTEM
Robert T. Joseph, Richboro, Pa., assignor to FMC Corporation, New York, N.Y.
Continuation-in-part of application Ser. No. 812,465, Apr. 1, 1969, which is a continuation-in-part of application Ser. No. 651,423, July 6, 1967, both now abandoned. This application June 9, 1971, Ser. No. 151,550
Int. Cl. B01j 11/02; C01b 31/08
U.S. Cl. 252—420                                          6 Claims

ABSTRACT OF THE DISCLOSURE

Spent active carbon, recovered from secondary sewage treatment and from beer and sugar refining, is regenerated by rapidly heating it in the dispersed phase in the presence of an activating atmosphere. The activating gases are preferably steam or carbon dioxide or both.

CROSS-REFERENCE TO RELATED APPLICATIONS

This application is a continuation-in-part of Ser. No. 812,465, filed Apr. 1, 1969, now abandoned, which in turn is a continuation-in-part of abandoned Ser. No. 651,423, filed July 6, 1967.

BACKGROUND OF THE INVENTION

(A) Field of the invention

This invention relates to active carbon. More particularly, it pertains to the regeneration of spent active carbon powders.

(B) Description of the prior art

The regeneration of spent, gas adsorbent, granular carbons is a known technique which is an important adjunct to industrial purification systems. In the usual procedure, the spent carbon is heated to drive off the adsorbed gases and vapors, thereby restoring the original activity of the carbon surface; or even more commonly, a desorbing gas, such as steam, is used to displace the adsorbed contaminants. The latter treatment is normally performed in place without removing the carbon from its bed or tower and in a patterned, cyclic manner. In fact, adsorbent beds of active carbon have been in operation for over thirty years using steam regeneration.

There is not, however, a generally available technique at the commercial level for the regeneration of spent active carbon powder, which is a type of adsorbent widely used in decolorizing and deodorizing liquids. The adsorbates taken up by these materials tend to be complex, large molecular weight molecules not readily displaced from their carbon substrate, at least not in the manner used to expel the gaseous impurities or volatile liquors from spent carbons. But even if this treatment did effect regeneration, the steam would carry out considerable quantities of powder from the contactor, thereby causing prohibitively high losses of recovered product. Under the circumstances, about the only recourse was to discard or burn spent carbon powder for fuel purposes rather than attempt to recover it for reuse. This rather wasteful practice was tolerated only because no satisfactory, commercially feasible regeneration process was known.

The economic picture, however, is now changing rapidly. In addition to its established uses, for example, in sugar refining and beer manufacture, powdered active carbon is extensively used in water purification and is under study for sewage treatment systems in the control of stream pollution. Some commercial installations are already in operation. Since these applications will require enormous quantities of active carbon powder, a practical and simple, low cost regeneration process is a mainfest need.

SUMMARY OF THE INVENTION

It now has been discovered that spent active carbon powder substantially all of which passed through −100 mesh can be regenerated whereby it is restored to essentially its original adsorptivity, by forming a dispersion thereof in an activating carrier gas, heating the dispersion of spent carbon in the carrier gas at a temperature of from about 1350° F. to about 1850° F. for a residence period of from less than about 1 second to about 5 seconds while maintaining the weight/volume ratio of the spent carbon particles to that of the carrier gas from about 0.0001 to 0.1 pound per cubic foot, cooling the dispersion and collecting the regenerated active carbon powder.

BRIEF DESCRIPTION OF THE DRAWING

The single figure shows, in schematic form the regeneration of spent active carbon powders in accordance with the process of the invention.

DESCRIPTION OF THE INVENTION AND THE PREFERRED EMBODIMENT

Figure 1:
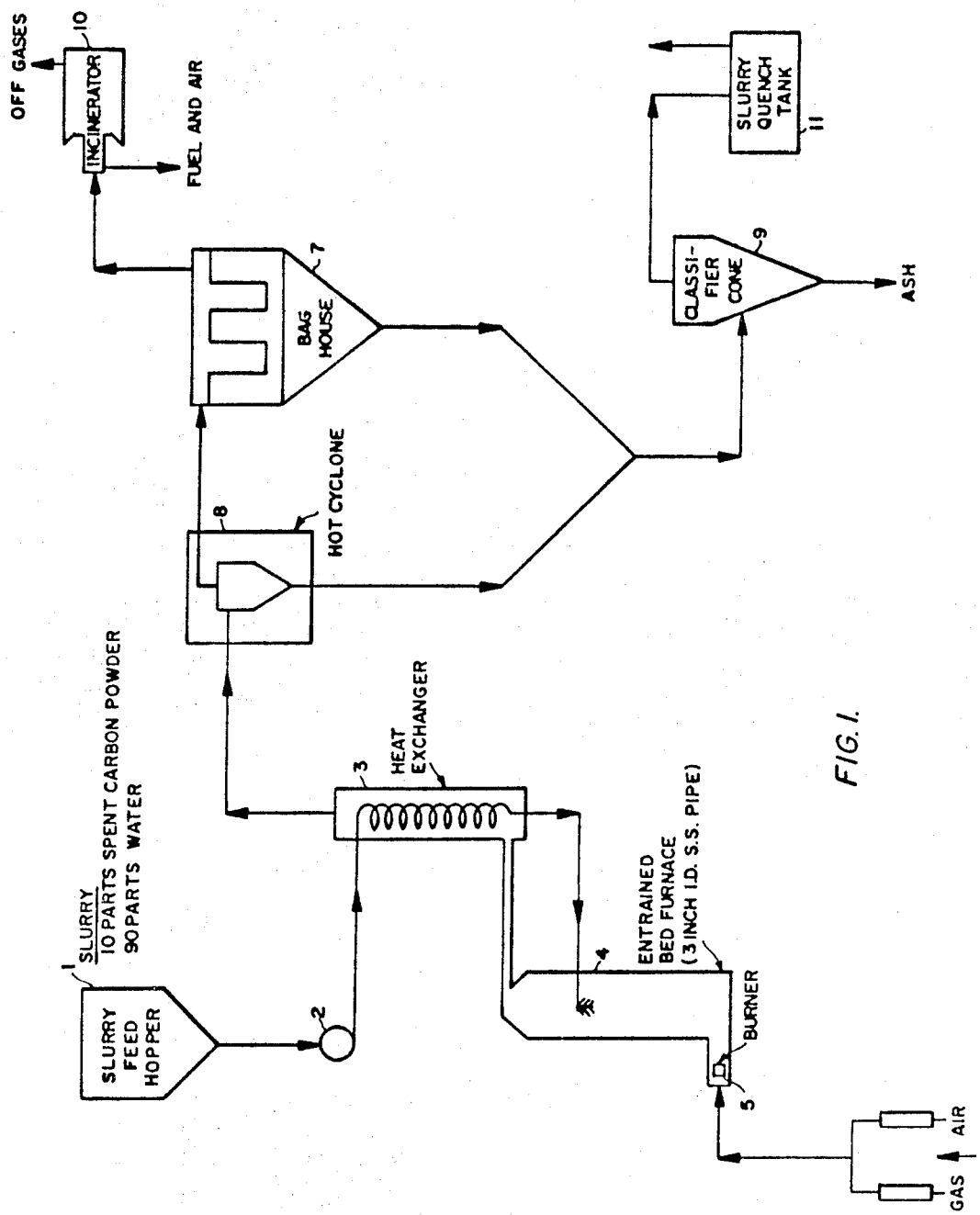

In carrying out the process of the invention, a dispersion of the recovered spent active carbon powder in an activating carrier gas is heated to activating temperatures. Conditions are normally from about 1350° F. to about 1850° F. for less than about 1 second to about 5 seconds in an activating carrier gas such as steam and/or carbon dioxide where the weight/volume ratio of the carbon particles to carrier gas is from about 0.0001 pound per cubic foot to about 0.1 pound per cubic foot. A preferred system utilizes steam as the activating gas at a loading of about 0.001 pound of solid per cubic foot at a temperature of about 1500° F. for residence times up to about 4 seconds. The regenerated product is passed through a cooling zone and then collected for reuse. Apparently the combination of steam and heat decomposes the adsorbed impurities, the result of which is restoration of the active surface character of the spent carbon. Evidence accumulated thus far indicates that the adsorbed pollutants may undergo pyrolysis with concomitant into adsorbent material which adds to the bulk of the regenerated carbon. By keeping mechanical losses to a minimum, the quantity of recovered product actually can exceed that of the spent starting material.

The art is thus not only provided with a low cost process for recovering spent active carbon powder, but at the same time is presented with a technique which disposes of pollutants by converting them into a valuable and usable material.

The present invention is predicated on the surprising discovery that restoration of the adsorptivity of spent active carbon powder takes place in a matter of a few seconds or less after exposure or contact at activating temperatures with the activating medium. This unusual behavior makes it possible to perform the regeneration using low cost industrial equipment of the utmost simplicity. For example a dispersion of the spent carbon in a steam carrier may be led through a heated zone at the requisite temperature where regeneration is effected in about 1 to 5 seconds. The spent particles enter one end of a tube and emerge after a few seconds as regenerated active carbon particles from the other end. For all practical purposes, regeneration of spent active carbon occurs immediately on contact with the heated steam carrier at the required reaction temperature.

It is to be understood that the process of the invention will not activate an unactivated char, as the residence time even for −325 mesh particles is too low to permit development of the inner structures that give active carbon its sorptive properties. In other words, the conditions are peculiarly suited to restoring exhausted carbon powders in which the particles are covered by a film or coating of an organic adsorbate. The conditions are not designed or intended to provide active carbon per se.

As understood herein, dispersion, dispersed phase and transport system are synonymous terms and mean a suspension of particles being swept along with a carrier gas. This system is to be distinguished from a fluid bed or fluidizing conditions where particles are held in suspension by the passage of a fluidizing gas flowing countercurrently to the particles. In a fluid bed, the suspended particles remain at the lower end of the reactor while the fluidizing gas passes through the bed and out the upper end. The particles must be sufficiently heavy so that they are not carried out with the fluidizer gas. In the transport system or dispersion phase, all particles always are carried along with the gas. A fluid bed cannot be maintained where the particles have insufficient weight, since they would be lost with the fluidizing gases. The spent carbon powders of the invention are extremely light and fluffy, mostly smaller than −325 mesh (U.S. Standard), and cannot be handled in a fluid bed. They would immediately be blown out at the top of the fluid reactor, resulting in prohibitively high recovery losses. But remarkably enough, the spent particles can be effectively regenerated when carried or suspended in a transport system of practical design and geometry. Thus, the character of active carbon powders that causes extreme difficulty in maintaining a fluid bed, i.e., the fineness of the carbon, and the ease with which it can be transported, is used to advantage in the present invention.

In a transport reactor system, a given solid is carried forward in the reacting gas medium and the desired reaction is caused to occur by regulating:

(1) The residence time of the solid in the reacting environment.
(2) The temperature of the reactor system.
(3) The amount of solid carried by a unit volume of the reactor gas.
(4) The composition of the reactor gas.
(5) The size of the solid being reacted.

With respect to residence time necessary to restore the original adsorbency, the lower limit for carbon powders having a particle size of 95% smaller than −325 mesh is below one second at the required regeneration temperature. The maximum residence time for such powders is determined by the practical size of reactors and equipment, and in this connection the upper limit appears to be about 5 seconds. Beyond this point excessive carbon consumption occurs and the original active carbon matrix begins to be consumed with an attendant build-up of ash and loss of adsorbency. In general, the greater the particle size, the longer the residence time needed to restore surface activity.

With respect to the temperature, this is preferably in the range of 1500° F. to 1600° F. for the aforediscussed residence periods. Regeneration can be effected over even wider temperature limits, i.e., about 1350° F. to 1850° F. but on the lower side, the residence time may become impractical from the standpoint of reactor geometry, and on the upper side, impractical in that the time limit to prevent excessive particle consumption would be too short to attain in practice and heating costs become excessive.

The amount of solid spent carbon used is between 0.0001 and 0.1 pound of carbon per cubic foot of carrier gas, preferably in the neighborhood of about 0.001 pound per cubic foot. If the lower limit is exceeded, economics of the system are less favorable because of the excessively high volume of gas to be handled. If the upper limit is exceeded, the advantage of a high ratio of activating gas to carbon particles is diminished and the short residence time would prove insufficient for restoration of the adsorbent surface.

With respect to the activating gas, this is preferably steam and/or carbon dioxide.

Generally the spent carbon is recovered as a slurry or damp cake, which contains sufficient water to supply the requisite steam for activation and transport purposes. One source of such spent carbon is a slurry containing about 10% carbon and 90% water recovered directly from a sewage treatment plant. Another source is the wet cake recovered from decolorizing syrups and sugars.

With respect to the size of solids being regenerated, this is limited by a consideration of the size that can be practically transported and can be reactivated in the short residence time in the reaction. A −325 mesh particle can be carried in a gas having a velocity of 1 foot per second or less. The size range is limited only by the volume of carrier gas available (velocity in a given reactor is a function of volume) and the means available to disengage and recover the regenerated particles from the carrier gas stream. The process is generally applicable to carbons that are finer than −100 mesh because of the ease with which such carbon can be carried by the transport stream, and preferably those that are smaller than 90% through −200 mesh. The invention is especially suited to the restoration of spent carbons at least 50% of which pass a −325 mesh.

Referring now to the drawing of the single figure, which shows in schematic form one embodiment of the regenerating process, a 10% slurry of spent active carbon of the type described herein, contained in feed hopper 1 is circulated by pump 2 through heat exchanger 3. In 3, the slurry is raised in temperature using indirect heat provided by the reaction products from furnace 4. The heated slurry then passes into furnace 4 where it is subjected to the activating environment for the desired residence time. The reaction products, gases and regenerated carbon adsorbent, are led to heat exchanger 3, where, by indirect transfer, the incoming feed will be heated and the reaction products lowered in temperature to a point required by the structural limits of the filter or bag house 7. From the heat exchanger 3 the reaction products are conveyed to hot cyclone 8 where approximately 80% of the regenerated carbon is disengaged. The solids so disengaged move via the outlet leg of 8 to classifying cone 9. The gases and entrained solids from 8 enter filter or bag house 7. The remaining entrained solid passes down to the classifier cone 9 and the clean gas is admitted to incinerator 10 for combustion and/or heat value reclamation. The hot solids are classified in 9 to separate any ash particles from the carbon and the carbon is collected in a slurry quench tank 11 for return to the treating system.

As understood herein the use of minus sieve numbers in referring to the dimension of a particle means that all particles up to and including the given dimension will pass through a sieve of a given minus mesh size. All mesh sizes are U.S. Standard.

The data and process conditions illustrated herein are based on an essentially steam activating medium.

The reactor may be heated either externally or by direct fire charging the slurry into a flame. The residence time will vary from about 1 to about 5 seconds depending on the reaction temperature used. Optimum residence time at 1600° F. is from 1 to 2 seconds. Shorter residence time may give incomplete reactivation of carbon and longer residence time may give low yields of reactivated carbon because of excessive reactivation at the temperatures used.

This process can be applied to a wide variety of powdered activated carbons.

The following nonlimiting examples are illustrative of the process of the invention and were carried out using the type of procedure shown in the drawing.

EXAMPLES 1-5

| Example number | 1 | 2 | 3 | 4 | 5 |
|---|---|---|---|---|---|
| Reaction conditions: | | | | | |
| Temperature, °F | | | 1,500 | | |
| Carrier gas velocity in feet per second | | | 1-3 | | |
| Carrier gas composition | | | Steam | | |
| Carrier gas loading in pounds per cubic foot | | | 0.001 | | |
| Solids residence time in seconds | | | 2-4 | | |
| Approximate feed rate in pounds of solids per hour per square foot of reactor cross section area | | | 20 | | |
| Weight loss of solids in reaction (dry basis) percent | | | 16 | | |
| Analysis of product (dry basis): | | | | | |
| Size consist [3] | | | 95% −325 Mesh | | |
| Iodine number [1] | 615 | 625 | 615 | 1,090 | 910 |
| Analysis of feed (dry basis): [2] [3] | | | | | |
| Size consist [3] | | | 95% −325 Mesh | | |
| Iodine number [1] | | | 350 | | |
| Moisture content, percent | | | 30 | | |
| Analysis of virgin carbon: [4] | | | | | |
| Size consist [3] | | | 95% −325 Mesh | | |
| Iodine number | | | 660 | | |
| Moisture content | | | Dry | | |
| Reactor geometry: [5] | | | | | |
| Inside diameter of reactor, inch | | | 3/8 | | |
| Length of reactor, inches | | | 48 | | |
| Recovery system | | | Water | | |

[1] Iodine number represents the milligrams of iodine adsorbed from a 0.1 N iodine solution by 1.0 g. of carbon.
[2] This feed stock was estimated as containing 30% by weight of adsorbate.
[3] Solids from effluent out of secondary treatment of community sewage.
[4] Commercial active carbon sold under the trademark Aqua Nuchar.
[5] Steel tube.

As can be seen, the carbon regenerated was restored to at least about 90% and in some instances to approximately 150% of its original adsorbtivity. The increased adsorbtivity is indicated by an iodine number of approximately 1000.

The following examples illustrate the invention where the spent carbon was recovered from sugar refining. The feed material was in the form of a slurry.

EXAMPLES 6-8

| Example number | 6 | 7 | 8 |
|---|---|---|---|
| Percent concentration solids in slurry | 10 | 9.4 | 10 |
| Carrier gas velocity, feet per second | 1.0 | 1.0 | 1.0 |
| Calculated residence time in reactor, seconds | 4.0 | 4.0 | 4.0 |
| Carrier gas composition | | Steam | |
| Carrier gas loading, pounds per cubic foot: | | | |
| Carbon | 0.01 | (0.001-0.02) | |
| Solids feed rate, pounds per hour per square feet of reactor area | | 2-5 (1-20) | |
| Loss of solids, percent by weight dry basis | 10 | 11 | 10.5 |
| Product analysis: [1] | | | |
| Iodine number: | | | |
| As is | 550 | 604 | 570 |
| Ash-free basis | 860 | 940 | 890 |

[1] Feed analysis: 36% water, 510 iodine number (800 iodine number on ash-free basis), 90% −200 mesh; 70% −325 mesh.

EXAMPLE 9

The procedure of Examples 1-8 was repeated using spent active carbon which had been used in the removal of impurities from beer. In general the results were similar to those of the previous examples.

While specific pieces of equipment and a specific flow sheet is indicated for the regeneration process shown herein, it is understood that any system which in effect accomplishes the conditions laid down herein may be used and will give the indicated results.

What is claimed is:

1. A process for regenerating active carbon powder substantially all of which passes through 100 mesh standard size containing organic adsorbate which consists of suspending all of said carbon powder containing organic adsorbate in an activating carrier gas comprising steam, directly heated by gaseous furnace reaction products, passing said suspension of carbon containing organic adsorbate in said activating carrier gas through a zone at a temperature of from about 1350° F. to about 1850° F. for a residence period of from less than about 1 second to about 5 seconds while maintaining the weight/volume ratio of the suspended carbon particles to that of the carrier gas from about 0.0001 to 0.1 pound per cubic foot, whereby all of the carbon particles suspended in the hot carrier gas move out of said zone for heating said carbon with said gas within said 1 to about 5 second period, and recovering active carbon powder from the carrier gas stream suspension discharging from the heating zone in an amount greater than the active carbon content of the initial charge of carbon powder.

2. The process of claim 1 wherein the suspension is formed from an aqueous slurry of the spent carbon, and the steam is provided by vaporization of the water in the aqueous slurry.

3. A process for regenerating active carbon powder substantially all of which passes through 100 mesh standard size containing organic adsorbate which consists of moving said carbon containing organic adsorbate in an aqueous slurry form into a reaction zone directly heated by gaseous furnace reaction products where said carbon is suspended in an activating carrier gas formed at least in part by volatilizing the aqueous content of said slurry, thereby heating the carbon material suspended in said carrier gas to a temperature of from about 1350° F. to about 1850° F. while maintaining the weight/volume ratio of the suspended carbon particles to that of the carrier gas from about 0.0001 to 0.1 pound per cubic foot, so that the carbon particles are swept through the reaction zone concurrently with the carrier gas within a period of from less than about 1 second to about 5 seconds.

4. The process of claim 3 wherein the temperature range is from about 1500° F. to about 1600° F.

5. The process of claim 3 wherein the spent active carbon is recovered from secondary sewage effluents.

6. The process of claim 3 wherein the spent active carbon is recovered from sugar refining.

References Cited

UNITED STATES PATENTS

| | | | |
|---|---|---|---|
| 3,275,547 | 9/1966 | Bucksteeg et al. | 201—25 |
| 3,525,673 | 8/1970 | Cameron | 201—38 |
| 3,298,928 | 1/1967 | Esterer | 201—25 |
| 1,641,053 | 8/1927 | Sauer | 252—421 |
| 3,362,887 | 1/1968 | Rodgers | 201—25 |
| 3,376,202 | 4/1968 | Mesher | 202—151 |
| 1,475,502 | 11/1923 | Manning | 252—417 |

FOREIGN PATENTS

| | | | |
|---|---|---|---|
| 213,940 | 5/1924 | Great Britain | 252—417 |
| 239,071 | 9/1925 | Great Britain | 201—21 |

U.S. Cl. X.R.

201—31, 38; 252—411, 417, 421

DANIEL E. WYMAN, Primary Examiner

P. E. KONOPKA, Assistant Examiner